US012280654B2

(12) United States Patent
Manhire et al.

(10) Patent No.: US 12,280,654 B2
(45) Date of Patent: Apr. 22, 2025

(54) LINKAGE FOR IMPROVED DIAGNOSTICS FOR KINEMATIC ASSEMBLY

(71) Applicant: Magna Exteriors Inc., Concord (CA)

(72) Inventors: Jeffrey B. Manhire, Rochester, MI (US); Braendon R. Lindberg, Metamora, MI (US); Daniel Vander Sluis, Rochester Hills, MI (US)

(73) Assignee: MAGNA EXTERIORS, INC., Aurora (CA)

( * ) Notice: Subject to any disclaimer, the term of this patent is extended or adjusted under 35 U.S.C. 154(b) by 308 days.

(21) Appl. No.: 17/801,881

(22) PCT Filed: Mar. 3, 2021

(86) PCT No.: PCT/US2021/020611
§ 371 (c)(1),
(2) Date: Aug. 24, 2022

(87) PCT Pub. No.: WO2021/178498
PCT Pub. Date: Sep. 10, 2021

(65) Prior Publication Data
US 2023/0084367 A1    Mar. 16, 2023

Related U.S. Application Data

(60) Provisional application No. 62/984,686, filed on Mar. 3, 2020.

(51) Int. Cl.
*B60K 11/08* (2006.01)
*B60K 11/04* (2006.01)
*F24F 13/15* (2006.01)

(52) U.S. Cl.
CPC ............ *B60K 11/085* (2013.01); *B60K 11/04* (2013.01); *F24F 13/15* (2013.01)

(58) Field of Classification Search
CPC ........ B60K 11/085; B60K 11/04; F24F 13/15; Y02T 10/88
See application file for complete search history.

(56) References Cited

U.S. PATENT DOCUMENTS

| 5,238,453 A * | 8/1993 | Heil ........................ F24F 13/15 137/601.09 |
| 5,921,028 A * | 7/1999 | Marocco ................. E06B 7/086 49/92.1 |
| 8,500,528 B2 * | 8/2013 | Leonhard ................ F24F 13/15 454/336 |

(Continued)

FOREIGN PATENT DOCUMENTS

| CN | 208085651 U * | 11/2018 | ........... B60K 11/085 |
| DE | 102017119098 A1 * | 2/2019 | |

(Continued)

*Primary Examiner* — James A Shriver, II
*Assistant Examiner* — Ian Bryce Shelton
(74) *Attorney, Agent, or Firm* — Warn Partners, P.C.

(57) ABSTRACT

A kinematic linkage assembly for an active grille shutter system having a frame connectable to a vehicle and forming an aperture. A kinematic linkage assembly with a plurality of vanes each moveable between an open position, an intermediate position, and a closed position. The rotation force from an actuator is transmitted across the first vane of the plurality of vanes to the first link at the first connection.

15 Claims, 10 Drawing Sheets

(56) References Cited

U.S. PATENT DOCUMENTS

| | | | | |
|---|---|---|---|---|
| 8,893,836 | B2* | 11/2014 | Asano | B60K 11/085 |
| | | | | 180/68.3 |
| 10,100,707 | B2* | 10/2018 | Wolf | B60K 11/085 |
| 10,166,858 | B2* | 1/2019 | Ibañez | B60K 11/085 |
| 10,766,356 | B2* | 9/2020 | Lindberg | B29C 48/0021 |
| 11,142,060 | B2* | 10/2021 | Gallagher Gil | B60K 11/085 |
| 2014/0102817 | A1* | 4/2014 | Asano | B60K 11/085 |
| | | | | 180/68.1 |
| 2015/0020758 | A1* | 1/2015 | Hosono | F01P 7/02 |
| | | | | 123/41.04 |
| 2017/0248066 | A1* | 8/2017 | Wolf | B60K 11/085 |
| 2017/0297424 | A1* | 10/2017 | Ibañez Moreira | B60K 11/085 |
| 2017/0341505 | A1* | 11/2017 | Knauer | B60K 11/085 |
| 2019/0366605 | A1* | 12/2019 | Dorigatti | B29C 45/16 |
| 2021/0122098 | A1* | 4/2021 | Herlem | B29C 48/21 |
| 2022/0176810 | A1* | 6/2022 | M?ller | B60K 11/085 |

FOREIGN PATENT DOCUMENTS

| | | | | | |
|---|---|---|---|---|---|
| EP | | 2799270 A1 | * | 11/2014 | ........... B60K 11/085 |
| EP | | 3210811 A1 | * | 8/2017 | ........... B60K 11/085 |
| FR | | 3047198 A1 | * | 8/2017 | ......... B29C 48/0022 |
| WO | WO-2014001430 A1 | | * | 1/2014 | ........... B60K 11/085 |
| WO | WO-2018029655 A1 | | * | 2/2018 | ........... B29C 45/006 |
| WO | WO-2019043315 A1 | | * | 3/2019 | ........... B60K 11/085 |
| WO | WO-2019205650 A1 | | * | 10/2019 | ........... B60K 11/085 |

* cited by examiner

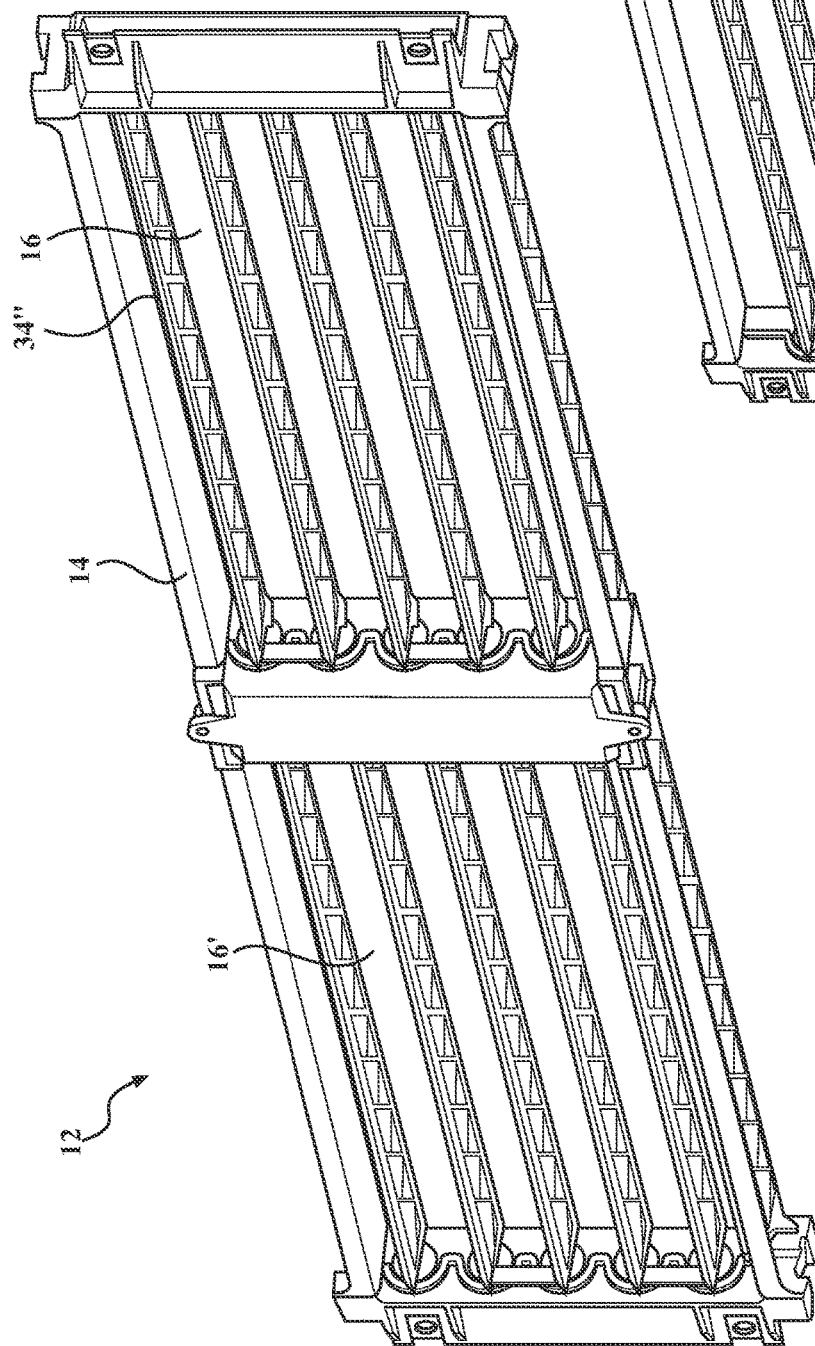
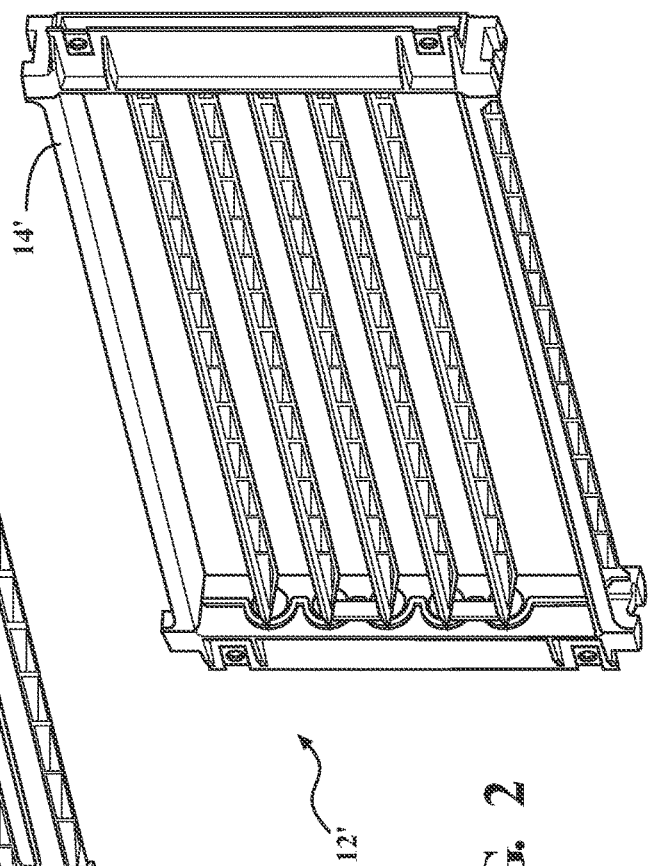

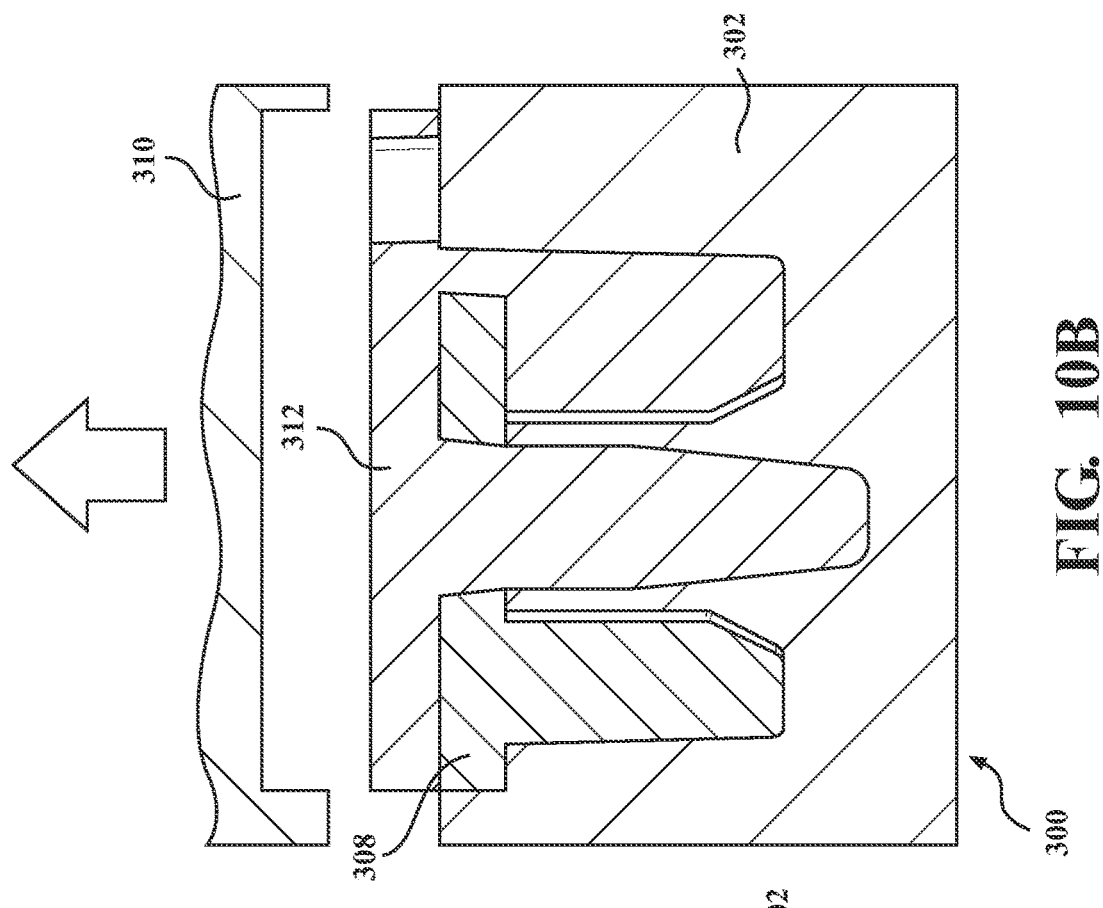
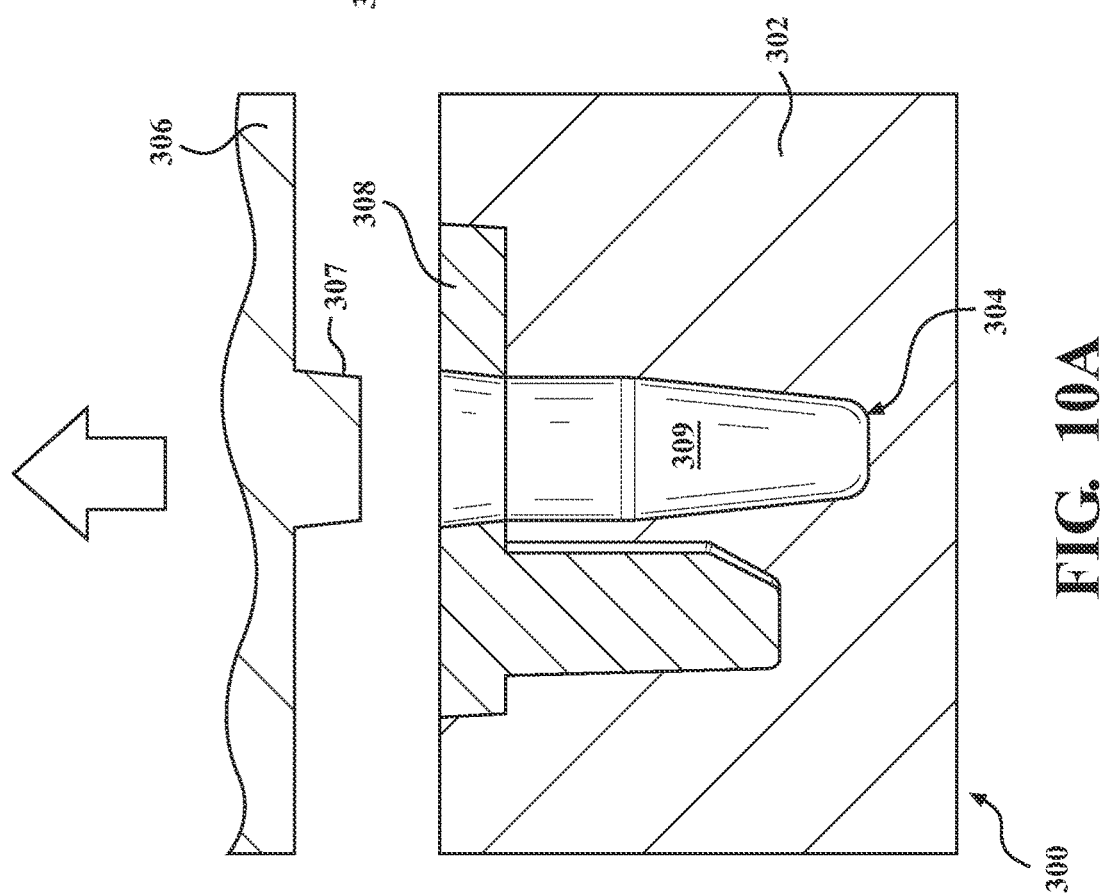

LINKAGE FOR IMPROVED DIAGNOSTICS FOR KINEMATIC ASSEMBLY

CROSS-REFERENCE TO RELATED APPLICATIONS

This application is a PCT International Application and claims benefit of U.S. Provisional Patent Application No. 62/984,686, filed Mar. 3, 2020. The disclosure of the above application is incorporated herein by reference.

FIELD OF THE INVENTION

The present invention relates to a kinematic linkage assembly for providing improved diagnostics on active aerodynamic vehicle systems such as an active grille shutter assembly.

BACKGROUND OF THE INVENTION

Current Active Grille Shutters (AGS) do not provide adequate monitoring capability if components are damaged or missing. Aerodynamic performance may be degraded without knowledge by the driver. As such devices currently on the market may not be On Board Diagnostic (OBD-2) compliant because the OBD-2 system is not able to tell if the active grille shutter system is working properly or not. It is a goal in the art in the present invention to design an improved linkage, which uses a kinematic linkage design that allows vehicle control systems to accurately detect broken or missing components of the active grille shutter system using on board diagnostic detection.

Typical AGS assemblies are a series of connected links, controlled by an actuator. The linkage is generally a single piece connecting all the vanes together. Due to the use of a single component, if some of the vanes are missing, the actuator cannot sense a difference, and a damaged assembly can go unnoticed. By making the linkage as a two-shot component with laterally opposing links that transfer drive forces in a zig-zag pattern across the AGS allows for the on-board diagnostics of the vehicle to detect a missing or damaged AGS.

Further areas of applicability of the present invention will become apparent from the detailed description provided hereinafter. The detailed description and specific examples, while indicating the preferred embodiment of the invention, are intended for purposes of illustration only and are not intended to limit the scope of the invention.

SUMMARY OF THE INVENTION

A kinematic linkage assembly for an active grille shutter system having a frame connectable to a vehicle and forming an aperture. A kinematic linkage assembly with a plurality of vanes each moveable between an open position, an intermediate position, and a closed position. The kinematic linkage further includes at least one link connected to and extending between a first vane and a second vane of the plurality of vanes, where the first vane and the second vane are adjacent each other. The first link of the at least one link is connected to a first connection on the first vane of the plurality of vanes and a first connection on the second vane of the plurality of vanes. An actuator is operably connected to a second connection on the first vane of the plurality of vanes for providing force that rotates the plurality of vanes between the open position and the closed position. Rotational force from the actuator is transmitted across the first vane of the plurality of vanes to the first link at the first connection.

BRIEF DESCRIPTION OF THE DRAWINGS

The present invention will become more fully understood from the detailed description and the accompanying drawings, wherein:

FIG. 1 is a side perspective view of an active grille shutter system according to one embodiment of the present invention.

FIG. 2 is a side perspective view of an active grille shutter system according to one embodiment of the present invention.

FIG. 10A is a cross-sectional schematic view of a method of forming a two-piece vane end cap according to one embodiment of the present invention.

FIG. 10B is a cross-sectional schematic view of a method of forming a two-piece vane end cap according to one embodiment of the present invention.

DETAILED DESCRIPTION OF THE PREFERRED EMBODIMENTS

Figure 4:
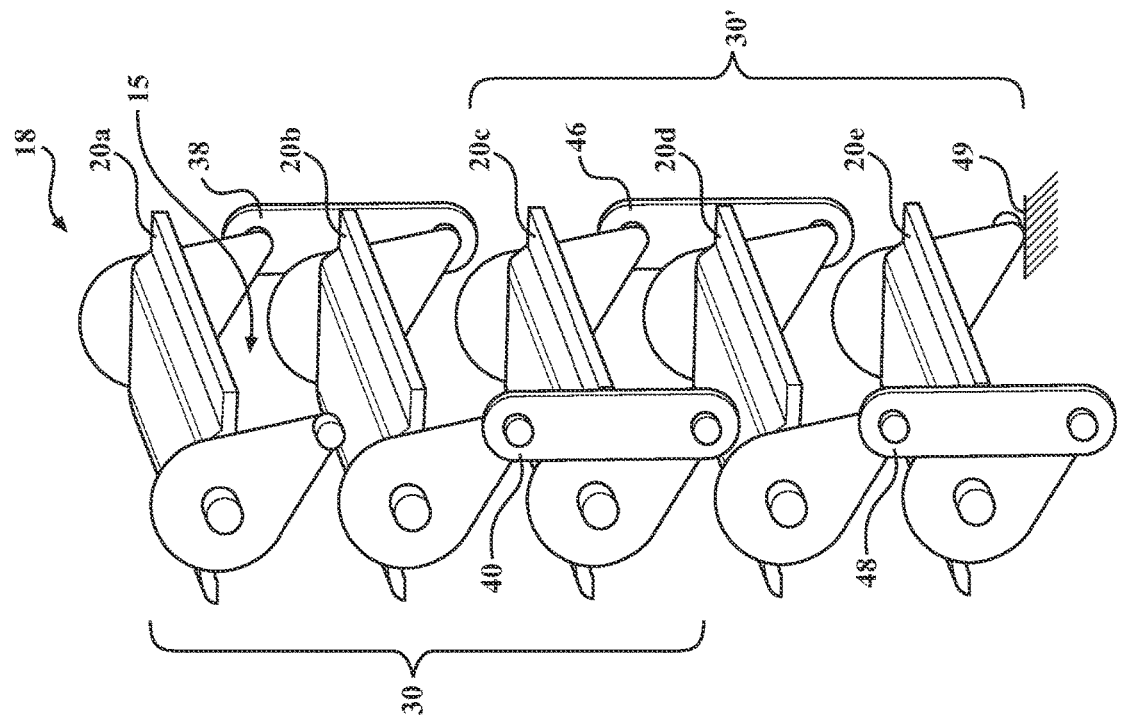
FIG. 4 is a schematic side perspective view of kinematic linkage assembly in an open position during normal operation.

The following description of the preferred embodiment is merely exemplary in nature and is in no way intended to limit the invention, its application, or uses.

Referring now to the Figures generally, there is shown a kinematic linkage assembly 18 for an active grille shutter (AGS) system 12 for a vehicle. FIGS. 1 and 2 show two different sized AGS systems 12, 12' that are typically connected to a vehicle body at an air intake for the engine compartment. For vehicles powered by internal combustion engines, this is typically in the area of the vehicle grille. The AGS system 12 has a frame 14 that is connected to the vehicle. The frame 14 forms two apertures 16, 16'. While two apertures 16, 16' are shown and described, it is within the scope of this invention for a greater or lesser number of apertures to be present. The frame 14 is connectable to a vehicle engine compartment at the air intake region. While each the AGS system 12, 12' shows three vanes it is within the scope of the invention for there to be a greater or lesser number of vanes depending on the needs of a particular application.

Figure 6:
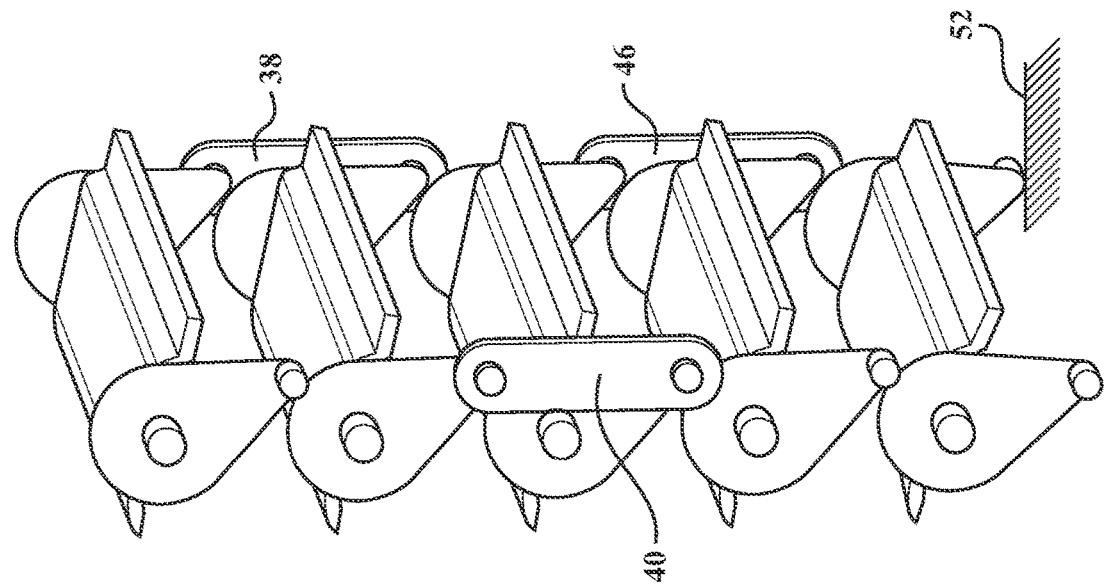
FIG. 6 is a schematic side perspective view of kinematic linkage assembly in an open position during abnormal operation.
Figure 7:
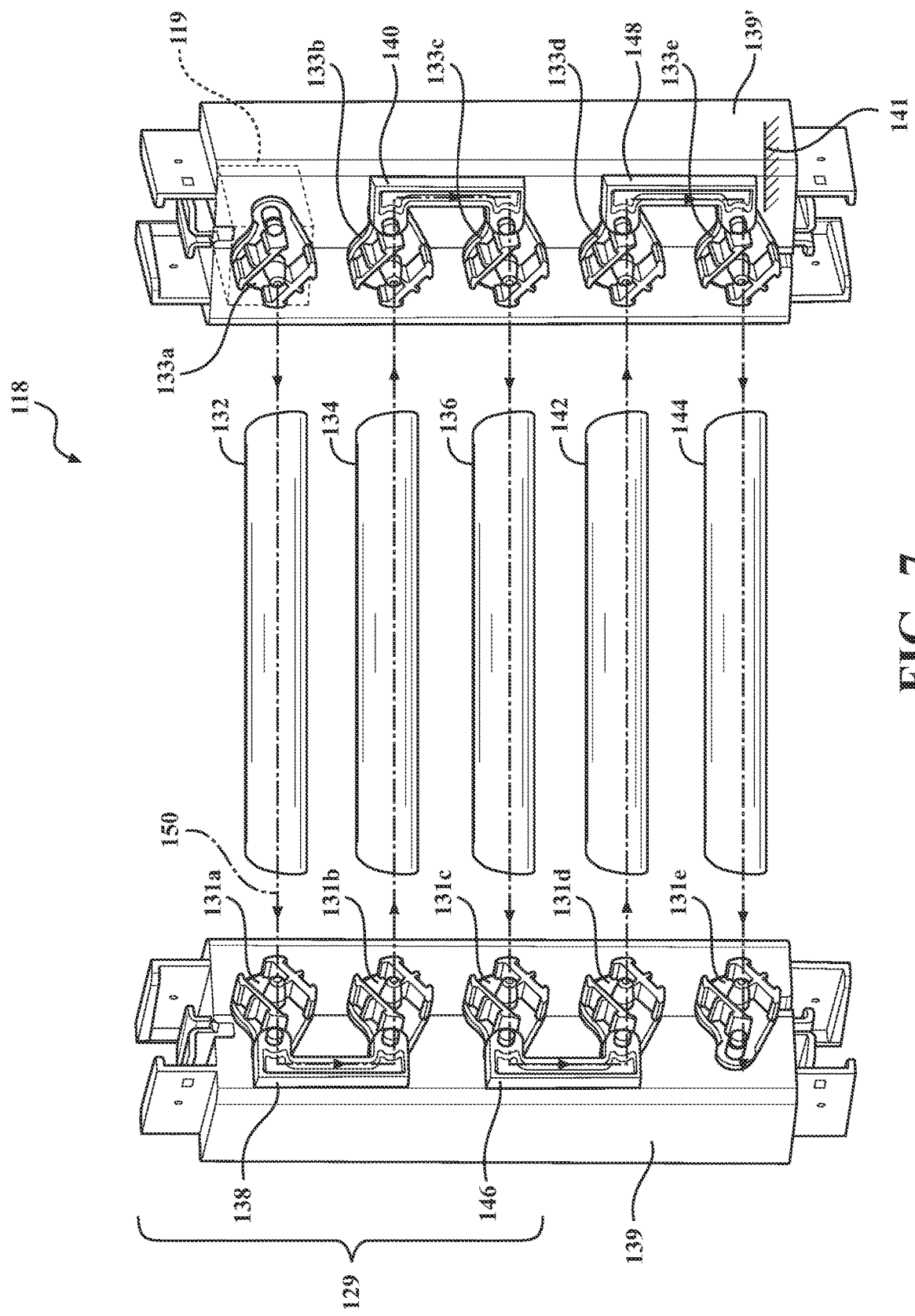
FIG. 7 is a rear schematic perspective view of kinematic linkage assembly according to the present invention.

Referring now to FIGS. 3-7 with reference to FIG. 7, the details of a kinematic linkage assembly 18 are shown. The kinematic linkage assembly 18 includes the vanes 20a, 20b, 20c, 20d, 20e, which are shown as five vanes, however any number of vanes can be used, but typically at least three vanes are the minimum number of vanes needed. It is possible to use less than three vanes, but some type of rotational link connection for the second link would have to be implemented. The vanes 20a, 20b, 20c, 20d, 20e are positioned across the aperture 14, 14' of the AGS system 12, 12' and are capable of rotating between a closed position where air flow through the aperture 14, 14' is blocked, an open position, where air flows past the vanes 20a, 20b, 20c, 20d, 20e; and an intermediate position where air flow past the vanes 20a, 20b, 20c, 20d, 20e is partially blocked as the vanes 20a, 20b, 20c, 20d, 20e are positioned between the closed position and open position. The rotation of the vanes is driven by an actuator (now shown) that relates to and directly rotates one of the vanes 20a, 20b, 20c, 20d, 20e; which is referred to as a driven vane. The driven vane can be any one of the vanes 20a, 20b, 20c, 20d, 20e depending on how the actuator is connected to the frame 14, 14'.

Each of the vanes 20a, 20b, 20c, 20d, 20e has a first connection 22a, 22b, 22c, 22d, 22e at a first end 24a, 24b, 24c, 24d, 24e of the respective vane and a second connection 26a, 26b, 26c, 26d, 26e at a second end 28a, 28b, 28c, 28d, 28e of the respective vane. The first connection 22a, 22b, 22c, 22d, 22e and the second connection 24a, 24b, 24c, 24d, 24e as shown are integral with the vanes 20a, 20b, 20c, 20d, 20e or they can be separate vane end caps that are connected, as shown in FIG. 7.

Figure 3:
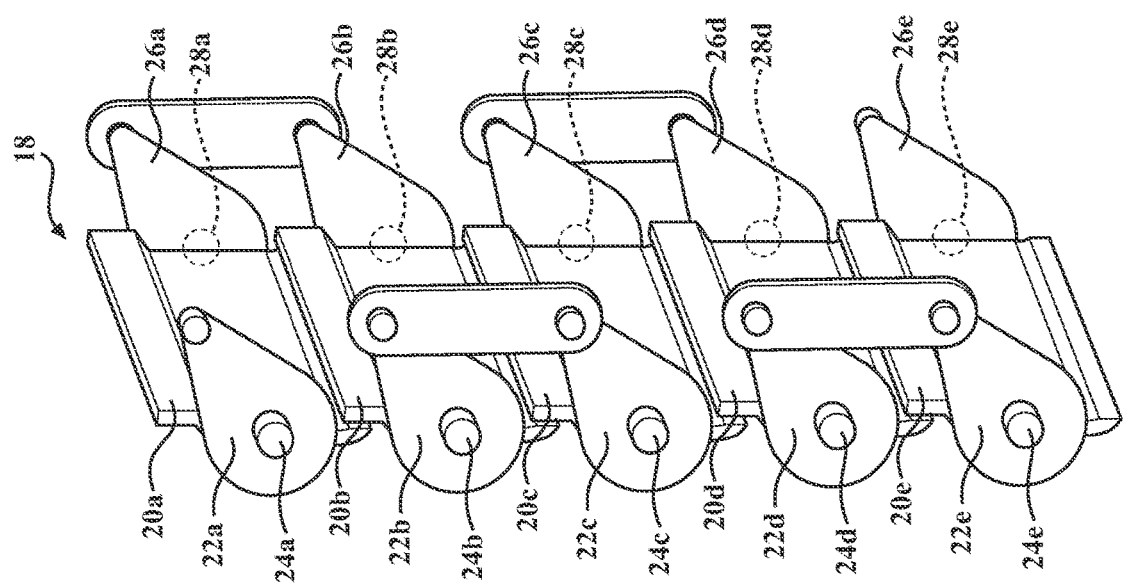
FIG. 3 is a schematic side perspective view of kinematic linkage assembly in a closed position during normal operation.
Figure 5:
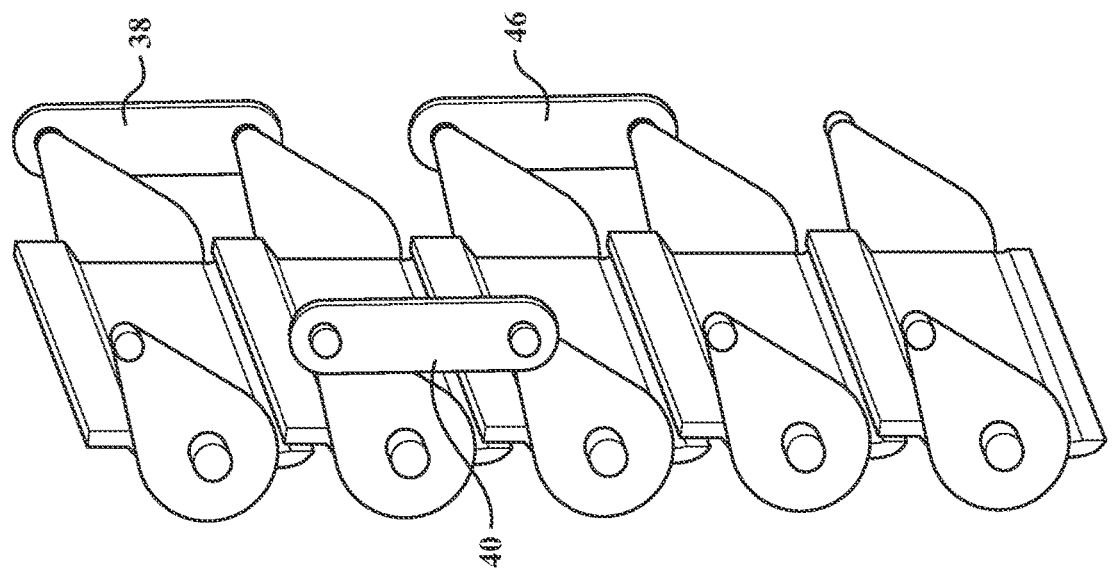
FIG. 5 is a schematic side perspective view of kinematic linkage assembly in a closed position during abnormal operation.

Referring now to FIGS. 3-6, the kinematic linkage assembly 18 includes at least three of the vanes 20a, 20b, 20c, 20d, 20e moveable between an open position shown in FIGS. 4 and 6, an intermediate position and a closed position shown in FIGS. 3 and 5. When in the closed position air is prevented from moving through an aperture 15 of the frame (not shown) and between each of the vanes 20a, 20b, 20c, 20d, 20e. When in the intermediate position or open position air is able to move through the aperture 14 of the frame.

There is a drive series 30 that includes vanes 20a, 20b, 20c, a first link 38 extending between the first vane 20a and the second vane 20b. The first link 38 is connected to the second connection 26a on the first vane 20a and the second connection 26b on the second vane 20b. A second link 40 extends between the second vane 20b and the third vane 20c. The second link 40 is connected to the first connection 22b on the second vane 20b and the first connection 22c on the third vane 20c. A drive series 30' begins with the second connection 26c of the third vane connecting to a third link 46. The third link 46 connects at a second end to the second side 26d of the fourth vane 20d. The first connection 22d of the fourth vane 20d connects to a first end of the fourth link 48. A second end of the fourth link 48 connects to the first connection 22e of the fifth vane 20e. The second connection of 26e of the fifth vane 20e contacts an end stop 49 when the fifth vane 20e is moved to the open position. Each drive series 30, 30' includes two links and at least two vanes. The number of drive series for a particular design is not limited to two, but instead there can be just a single drive series or there can be any number of drive series depending on how many vanes are needed, the size of the frame and actuator. In the embodiment shown in FIGS. 3-6 any one of the vanes 20a, 20b, 20c, 20d, 20e can be a driven vane, meaning that the vane is driven by an actuator that provides rotational kinetic motion to the kinematic linkage assembly 18. Also, the rotational kinetic motion in one drive series 30, 30' gets transferred to all other drive series provided that there are no broken or missing components.

FIGS. 3 and 4 depict the movement of the kinematic linkage assembly 18 during normal operation, where the vanes 20a-e move between a closed position (shown in FIG. 3) and an open position (shown in FIG. 4). When operating in a normal manner the vanes and links rotate between an open position and closed position that are a normal range of rotation. FIGS. 5 and 6 depict abnormal operation of the kinematic linkage assembly 18, which can be detected by the control system through overdriving of the actuator. As shown the fourth link 48 (shown in FIGS. 3 and 4) is missing, which causes the second connection 26e to be overdriven by the actuator and contact a stop 52. The actuator current will spike as the second connection 26e contacts the stop 52, which is sensed by a controller that is part of the OBD-2 system. This results in an error code or message indicating that the kinematic linkage assembly 18 is not operating properly. While in the present embodiment of the invention the sensing of the abnormal operation is triggered by a spike in the actuator current, it is possible that a sensor, such as a contact sensor at the location of the stop 52 be used instead. Also as described above the abnormal operation is cause by the missing fourth link 48, it is possible for other events to cause abnormal operation, such as but not limited to broken vanes, other missing links, foreign objects the AGS system or any other event that can cause the actuator to overdrive.

Referring now to FIG. 7, a kinematic linkage assembly 118 is shown. The kinematic linkage assembly 118 includes frame end caps 139, 139' on two parallel sides of the aperture form the sides of a frame of an active grille shutter system. Extending between the frame end caps 139, 139' are vanes 132, 134, 136, 142, 144, which connect respectively to a first end to a first vane end cap 131a, 131b, 131c, 131d, 131e, and at a second end to a respective second vane end cap 133a, 133b, 133c, 133d, 133e. Further provided is a first link 138 connected between the first vane end cap 131a and first vane end cap 131b, a second link 140 connects between second vane end cap 133b and second vane end cap 133c, a third link 146 connects between first vane end cap 131c and first vane end cap 131d, while a fourth link 148 connects between second vane end cap 133d and second vane end cap 133e. The placement of the first link 138 and third link 146 on the frame end cap 139 and the second link 140 and fourth link 148 on the frame end cap 139' in an alternating pattern creates a force pathway 150 that has serpentine pattern that traverses the vanes 132, 134, 136, 142, 144; thereby making the vanes 132, 134, 136, 142, 144 a necessary component for the kinematic linkage assembly 118 to properly function. If one of the vanes 132, 134, 136, 142, 144 is broken or missing an actuator 119 that drives the kinematic linkage assembly 118, will experience a current spike, which can trigger an error notification by the vehicle's on-board diagnostic system. Alternatively, an end stop 141 can include a contact sensor that will sense when the kinematic linkage assembly 118 is not properly functioning because the fourth link bar 148 will contact the end stop 141 indicating that there is over-rotation happening in the kinematic linkage assembly 118, thereby suggesting that components are either broken or missing along the force pathway 150.

The actuator 119 is connected through frame end cap 139' and rotates second vane end cap 133a. A drive series 129 is created by the second vane end cap 133a, vane 132, first vane end cap 131a, first link 138, first vane end cap 131b, vane 134 and second vane end cap 133b, second link 140 second vane end cap 133c, vane 136 and first vane end cap 131c; which are the minimum number of components needed to create a serpentine force pathway of the kinematic linkage assembly 118 according to the present embodiment of the invention. The drive series 129 defines in part the force pathway 150 since the force pathway 150 passes through the drive series 129. The drive series 129 can be larger and include all of the components along the force pathway 150 shown in FIG. 7, however the force pathway 129 described above is just the minimum number of components needed for any particular embodiment.

The full operation of the kinematic linkage assembly 118 is as follows, the actuator 119 rotates second vane end cap 133a whereby rotating the first vane 132, which is transferred to the second vane 134 through the first link 138. The rotational force then traverses the second vane 134 and is transferred to the third vane 136 through the second link 140. FIG. 7 also shows the fourth vane 142, fifth vane 144, third link 146 and fourth link 148. The force of the rotation of the third vane 136 is also transferred to the fourth vane 142 through the third link 146. The force then traverses the fourth vane 142 and is transferred through the fourth link 148 onto the fifth vane. The result is the force pathway 150 that has serpentine pattern or force pathway that traverses across each vane, thereby making each vane a part of the actuation mechanism rather than just being a component that is driven by the actuator mechanism. Also, the vanes 132, 134, 136 form an actual part of the drive series of the kinematic linkage assembly 118, rather than being a component that is just moved by the drive mechanism of the grille.

Figure 8:
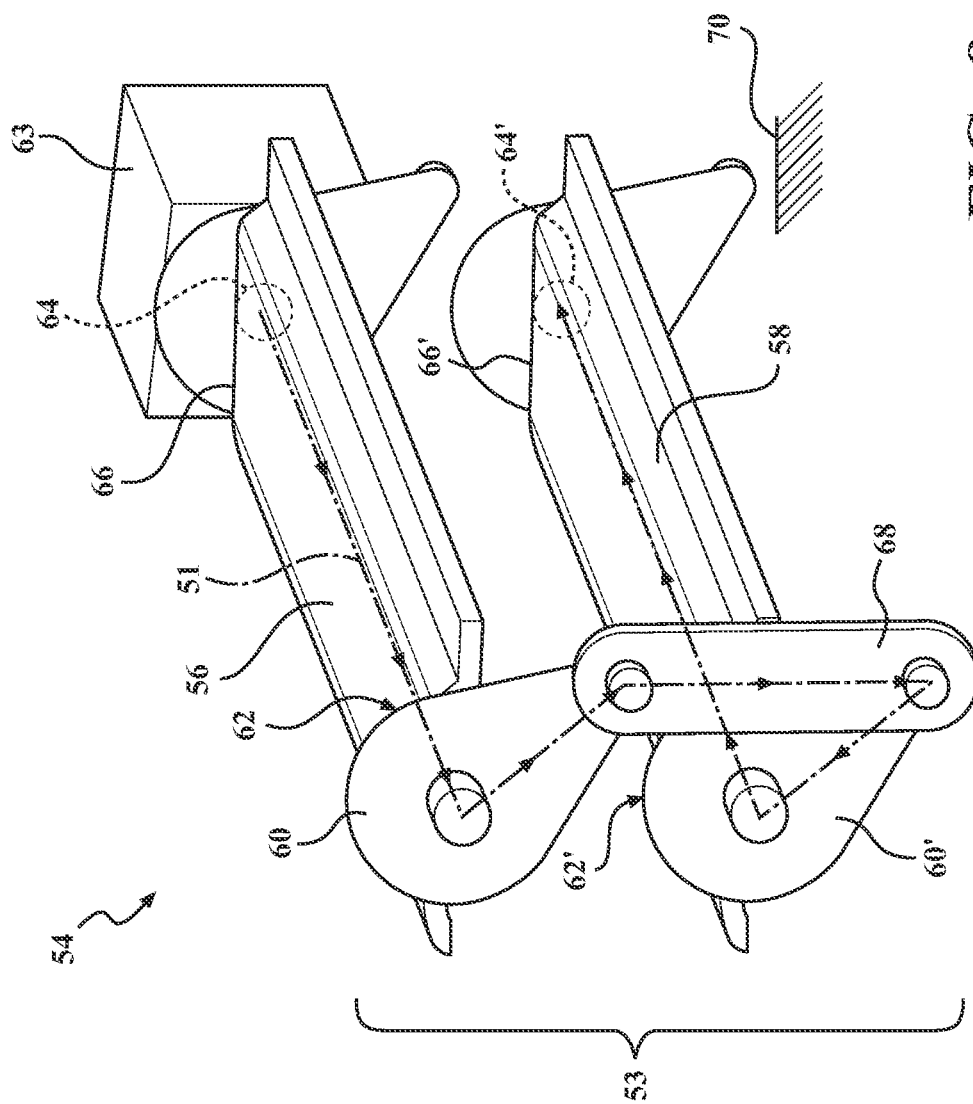
FIG. 8 is a schematic view of a two-vane kinematic linkage assembly according to another embodiment of the invention.

Referring now to FIG. 8 there is a kinematic linkage assembly 54 according to an alternate embodiment of the invention. This embodiment of the invention is implemented on an active grille shutter system having a frame forming an aperture, wherein the frame is connectable to a vehicle engine compartment at an air intake region. The kinematic linkage assembly 54 as shown has a drive series 53 consisting of only two vanes, that being a first vane 56 and a second vane 58 adjacent the first vane 56, both of which are capable of rotating between a closed position and an open position. When in the closed position air is prevented from moving through the aperture of the frame. When in the intermediate position or open position air can move through the aperture of the frame. The drive series 53, first vane 56 and second vane 58 each include a first connection 60, 60' at a first end 62, 62' and a second connection 64, 64' at a second end 66, 66'. The drive series 53 further includes a first link 68 connected to and extending between the first vane 56 and the second vane 58. The first vane 56 and the second vane 58 are adjacent each other and the first link 68 is connected to the first connection 60 on the first vane 56 and the first connection 60' on the second vane 58.

The kinematic linkage assembly 54 has a force pathway 51 that is serpentine. An actuator 63 is operably connected to the second connection 64 on the first vane 56 for providing force that rotates the first vane 56 and second vane 58 to rotate between the open position and the closed position. The rotational force from the actuator 63 is transmitted along the force pathway 51, across the first vane 56 of the link 68 at the first connection 60, which then gets transferred to the second vane 58 through the link 68. If one of the vanes is broken or if the first link 68 is missing or damaged the second vane will strike a stop 70 and the abnormal operation will be detected by a sensor at the stop 70 or by overdriving of the actuator as described above with reference to FIG. 7.

Figure 9A:
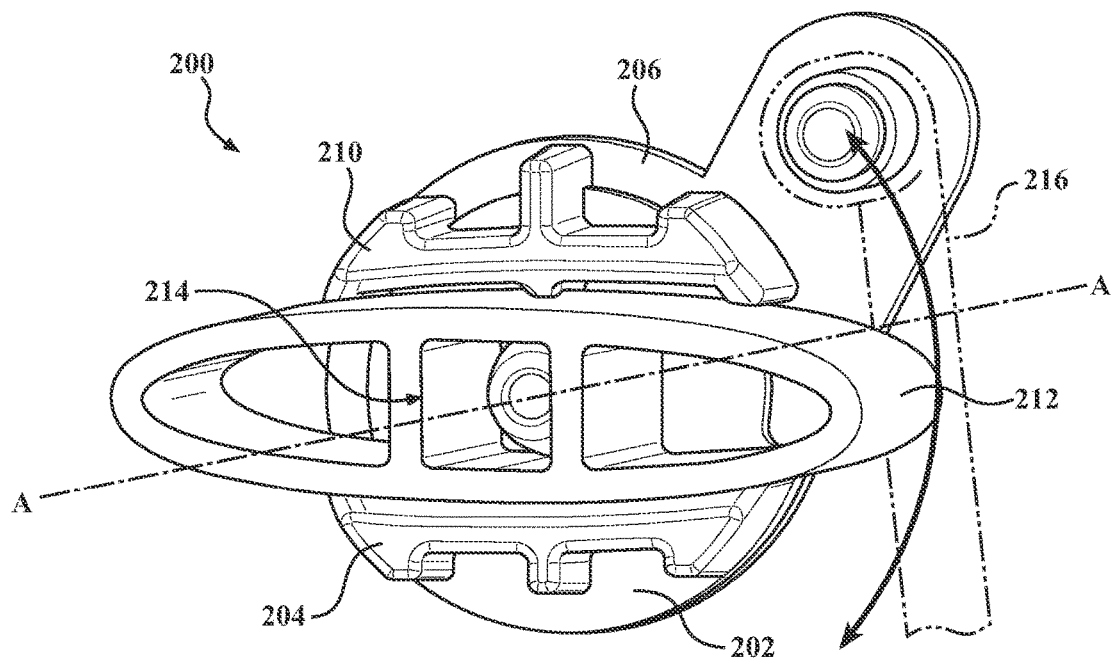
FIG. 9A is a side perspective view of a two-piece vane end cap having a cross-sectioned vane attached according to an alternate aspect of the present invention.

FIGS. 9A-14B depict an alternate embodiment of the invention that utilizes two-piece vane end caps for retaining the vanes and a two-shot molding process for producing the two-piece vane end caps. Referring now to FIGS. 9A-9C a two-piece vane end cap 200 design is shown and described. The two-piece vane end cap is rotatably connected to the frame end caps 139, 139' and replaces the first vane end cap 131a-e, 133a-e of the kinematic linkage assembly 118 of FIG. 7. The two-piece vane end cap 200 has a first piece 202, with a first vane retainer 204 formed thereon. A second piece 206 has a vane post 208 extending through the first piece 202, thereby allowing the first piece 202 and second piece 206 to pivot relative to each other about the vane post 208. The second piece 206 further provides a second vane retainer 210 to the two-piece vane end cap 200. The first vane retainer 204 and second vane retainer 210 are configured to receive a vane 212, while the vane post 208 slides into an alignment channel 214 of the vane 212 to ensure that the vane 212 is centered between the first vane retainer 204 and second vane retainer 210.

Figure 9B:
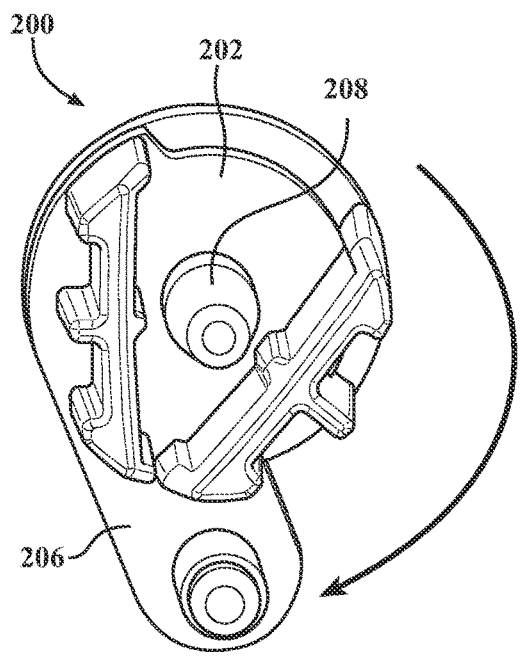
FIG. 9B is a side perspective view of a two-piece vane end cap according to an alternate aspect of the present invention.
Figure 9C:
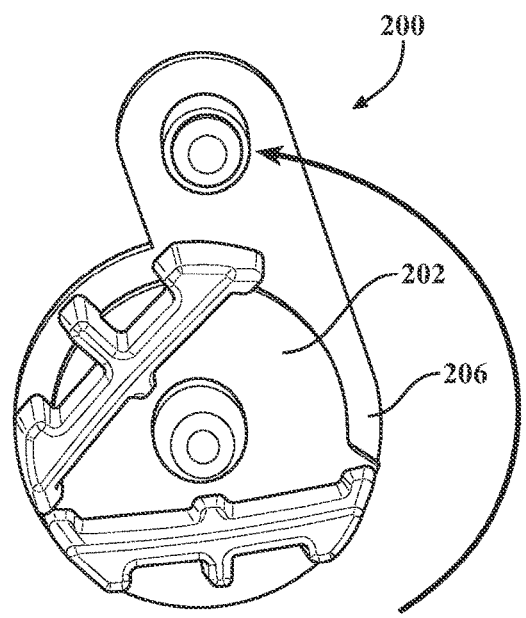
FIG. 9C is a side perspective view of a two-piece vane end cap according to an alternate aspect of the present invention.

The second piece further includes a link post 216 that is used to pivotally connect to a link bar 216. The link bar 216 has the same function as any of the other links bars discussed in all of the other embodiments of the invention. The link bar 216 causes the two-piece end cap 200 to rotate about an axis A-A extending through the vane post 208. If the vane 212 is removed, as shown in FIGS. 9B and 9C the second piece 206 rotates about the first piece 202 and the second clamp 210 strikes the first clamp 204, thereby creating an over rotation even that is sensed by an actuator or other sensor.

Referring now to FIGS. 10A and 10B a method 300 of forming the two-piece vane end cap 200 is shown and described. The method 300 include a first mold half 302 with a forming surface 304 formed therein. A second mold half 306 is lowered into contact with the first mold half 302 and includes a shut off portion 307 that prevents molten material from flowing into a post forming portion 309 of the forming surface 304. A first shot of molten material 308 is injected and cooled to form the first piece 202 of the two-piece end cap 200 shown in FIGS. 9A-9C. The second mold half 306 is separated from the first mold half 302. In a next of the method 300 a different second mold half 310 is placed in contact with the first mold half 302. The different second mold half 310 does not have the shut off portion 307 found on the first mold half 306. A second shot of molten material 312 is injected and travels into the post forming portion 309 and the second piece 206 of the two-piece end cap 200 is formed. The first shot of molten material 308 and the second shot of molten material 312 can be the same or different material as long as the first shot of molten material 308 is allowed to cure prior to injecting the second shot of molten material 312.

Figure 11:
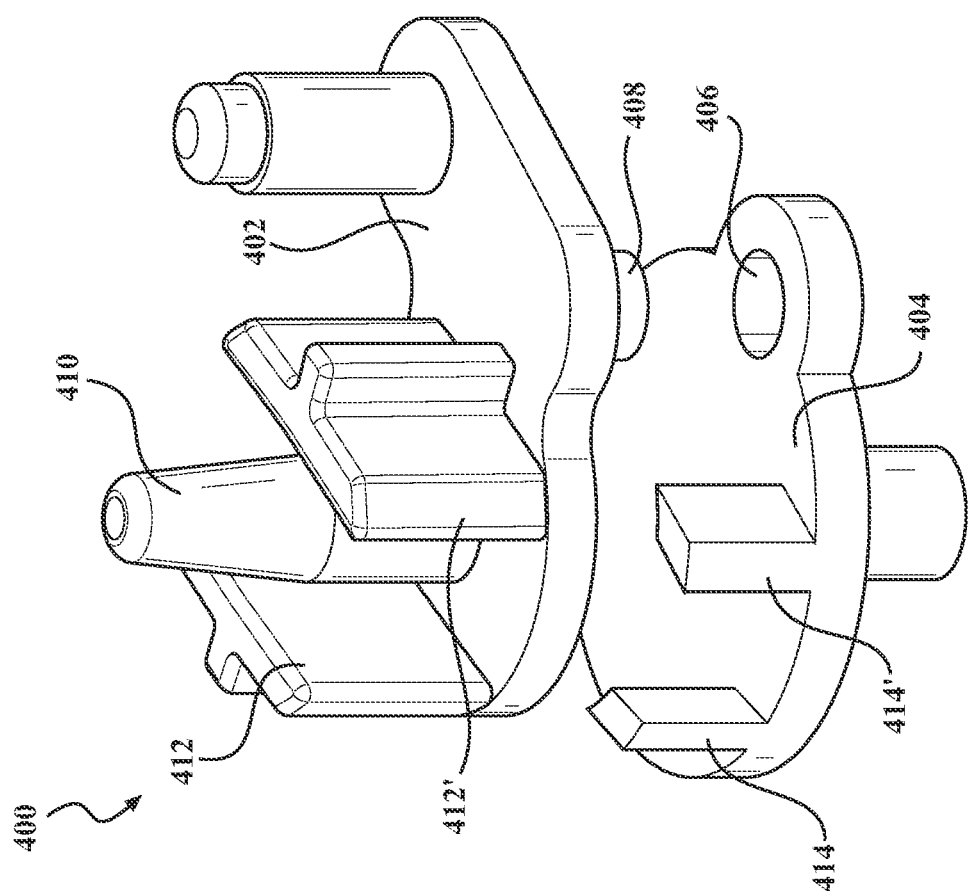
FIG. 11 is an exploded side perspective view of a two-piece vane end cap according to another embodiment of present invention.
Figure 12A:
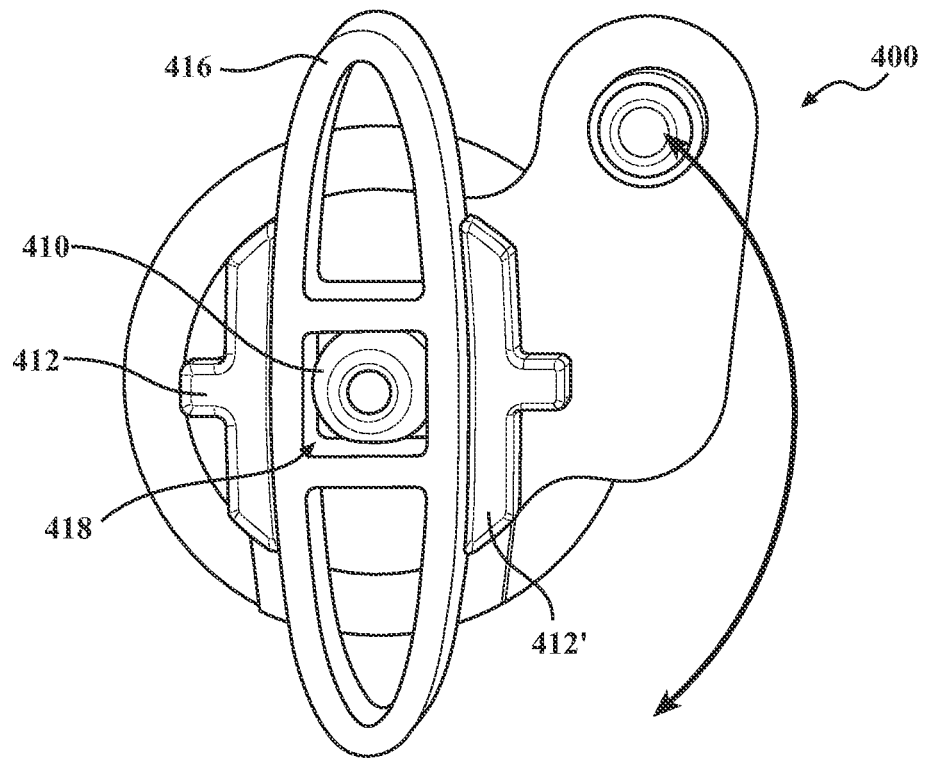
FIG. 12A is a side perspective view of a two-piece vane end cap with a partially cross sectioned vane attached according to another embodiment of the present invention.
Figure 12B:
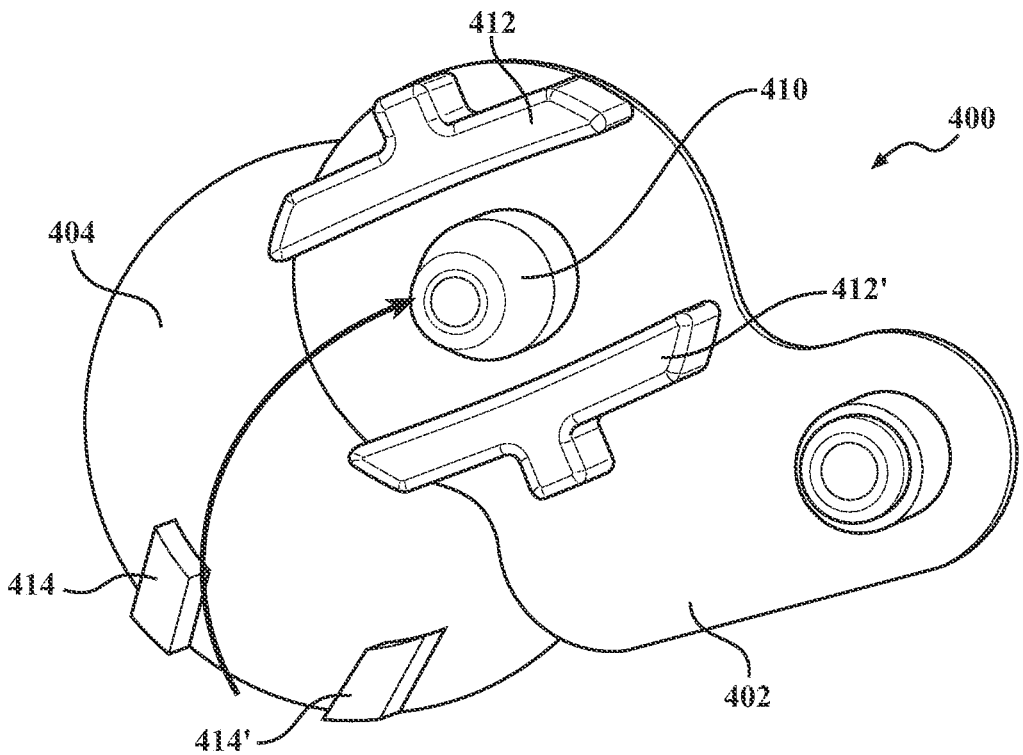
FIG. 12B is a side perspective view of a two-piece vane end cap the vane removed according to another embodiment of the present invention.

Referring now to FIGS. 11, 12A and 12B a two-piece end cap 400 according to an alternate embodiment of the invention is shown and described. The two-piece end cap 400 includes a first piece 402 that is pivotally connected to a second piece 404 using an offset pivot, provided by an offset aperture 406 on the second piece 404 that pivotally receives an offset post 408 on the first piece 402.

The first piece 402 includes a vane post 410 and two vane retainers 412, 412' located an opposing sides of the vane post 410. The second piece 404 has two vane retainers 414, 414' that align with the two vane retainers 412, 412' when the first piece 402 and second piece 404 are aligned, thereby allowing a vane 416 to be placed between the two vane retainers 412, 412 and two vane retainers 414, 414'. Also, the vane 416 has an alignment channel 418 that the vane post 410 aligns with and extends into, to ensure proper alignment of the vane 416 with the two-piece vane cap 400. The vane 416 can only be connected to the two-piece end cap 400 when the two vane retainers 412, 412' are aligned with the two vane retainers 414, 414'. If the vane 416 is removed from the two-piece end cap 400, the first piece 402 rotates out of alignment with the second piece 404 by rotating about the offset post 408 positioned in the offset aperture 406, which is depicted in a comparison of FIG. 12A with FIG. 12B. If the vane 416 is properly connected rotation between the first piece 402 and the second piece 404 is not possible because the vane 416 prevents the rotation by engaging both the two vane retainers 412, 412' and vane retainer 414, 414'.

Figure 13B:
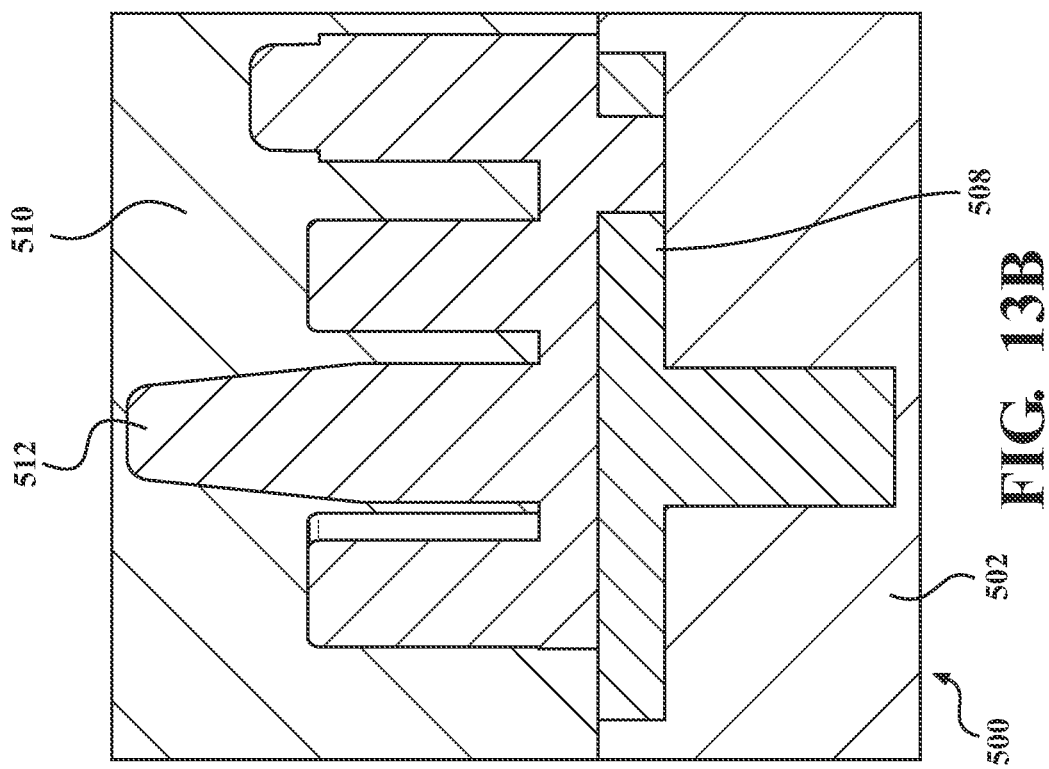
FIG. 13B is a cross-sectional schematic view of a method of forming a two-piece vane end cap according to another embodiment of the present invention.
Figure 13A:
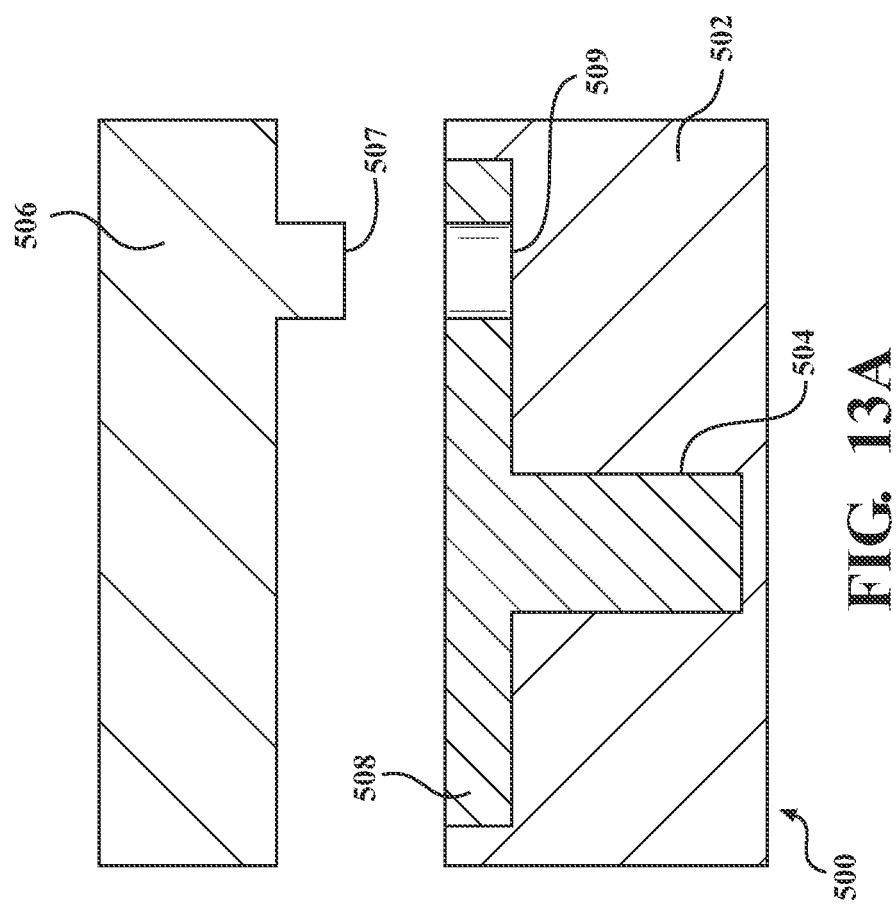
FIG. 13A is a cross-sectional schematic view of a method of forming a two-piece vane end cap according to another embodiment of the present invention.

Referring now to FIGS. 13A and 13B a method 500 of forming the two-piece vane end cap 400 is shown and described. The method 500 include a first mold half 502 with a forming surface 504 formed therein. A second mold half 506 is lowered into contact with the first mold half 502 and includes a shut off portion 507 that prevents molten material from flowing into an offset post forming portion 509 of the forming surface 504. A first shot of molten material 508 is injected and cooled to form the second piece 404 of the two-piece end cap 400 shown in FIGS. 11, 12A-12B. The second mold half 506 is separated from the first mold half 502. In a next of the method 500 a different second mold half 510 is placed in contact with the first mold half 502. The different second mold half 510 does not have the shut off portion 507 found on the first mold half 506. A second shot of molten material 512 is injected and travels into the offset post forming portion 509 and the first piece 402 of the two-piece end cap 400 is formed. The first shot of molten material 508 and the second shot of molten material 512 can be the same or different material as long as the first shot of molten material 508 is allowed to cure prior to injecting the second shot of molten material 512.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A kinematic linkage assembly for an active grille shutter system comprising:
    an active grille shutter system having a frame forming an aperture, wherein the frame is connectable to a vehicle engine compartment;
    a kinematic linkage assembly connected with the frame of the active grille shutter system, wherein the kinematic linkage assembly includes a plurality of vanes pivotally connected to the frame at a first connection and a second connection, wherein the plurality of vanes are each moveable between an open position and a closed position, such that when the plurality of vanes are in the closed position, air is prevented from moving through the aperture of the frame and when the plurality of vanes are in the open position, air is able to move through the aperture of the frame;
    the kinematic linkage assembly further includes at least one drive series that includes the plurality of vanes, wherein a first vane of the plurality of vanes is connected to an actuator that supplies rotation force to the at least one drive series, wherein the at least one drive series in part defines a force pathway that traverse the plurality of vanes in a serpentine pattern, thereby causing the plurality of vanes to rotate between the open position and the closed position when rotational force is transmitted through the force pathway; and
    wherein the first connection and the second connection between the frame and each of the plurality of vanes includes a two piece end cap each having a first piece with at least one vane retainer, and a second piece having at least one vane retainer, wherein the first piece and the second piece are connected together at a pivot and when one of the plurality of vanes is placed in contact with the at least one vane retainer of the first piece and the at least one vane retainer of the second piece the first piece and the second piece rotate about the pivot.

2. The kinematic linkage assembly of claim 1 further comprising an end stop forming part of the kinematic linkage assembly, for contacting a second vane of the plurality of vanes when the second vane is overdriven.

3. The kinematic linkage assembly of claim 1, wherein the at least one drive series further includes a link connected to and extending between the first vane and a second vane of the plurality of vanes, where the first vane and the second vane are adjacent each other, wherein the link is connected to the first connection on the first vane of the plurality of vanes and the first connection on the second vane of the plurality of vanes.

4. The kinematic linkage assembly of claim 3, wherein the at least one drive series further includes a third vane of the plurality of vanes and a link bar connected between the second connection of the second vane of the plurality of vanes and the second connection of the third vane of the plurality of vanes, wherein rotational force from the second vane of the plurality of vanes is transmitted across second vane of the plurality of vanes to the link between the second vane of the plurality of vanes and the third vane of the plurality of vanes, thereby causing the third vane of the plurality of vanes to rotate between the open position, and the closed position.

5. The kinematic linkage assembly of claim 1 wherein the pivot is a vane post extending from the second piece through the first piece.

6. The kinematic linkage assembly of claim 1 wherein the pivot includes an offset aperture formed on the first piece that receives an offset post formed on the second piece.

7. A kinematic linkage assembly for an active grille shutter system comprising:
    an active grille shutter system having a frame forming an aperture, wherein the frame is connectable to a vehicle engine compartment;
    a kinematic linkage assembly connected with the frame of the active grille shutter system, wherein the kinematic linkage assembly includes a plurality of vanes each moveable between an open position and a closed position such that when in the closed position, air is prevented from moving through the aperture of the frame and when in the open position, air is able to move through the aperture of the frame, wherein the plurality of vanes each include a first connection at a first end and a second connection at a second end;

the kinematic linkage assembly further includes a link connected to and extending between a first vane and a second vane of the plurality of vanes, where the first vane and the second vane are adjacent each other, wherein the link is connected to the first connection on the first vane of the plurality of vanes and the first connection on the second vane of the plurality of vanes;

an actuator operably connected to the second connection on the first vane of the plurality of vanes for providing force that rotates the plurality of vanes between the open position and the closed position, wherein rotational force from the actuator is transmitted across the first vane of the plurality of vanes to the link at the first connection and onto the second vane of the plurality of vanes, which rotates between the open position and the closed position; and wherein the first connection and the second connection between the frame and each of the plurality of vanes includes a two piece end cap each having a first piece with at least one vane retainer, and a second piece having at least one vane retainer, wherein the first piece and the second piece are connected together at a pivot and when one of the plurality of vanes is placed in contact with the at least one vane retainer of the first piece and the at least one vane retainer of the second piece the first piece and the second piece rotate about the pivot.

8. The kinematic linkage assembly of claim 7 further comprising an end stop forming part of the kinematic linkage assembly, for contacting one vane of the plurality of vanes when the one vane is overdriven.

9. The kinematic linkage assembly of claim 7 further comprising:
a third vane of the plurality of vanes;
a link bar connected between the second connection of the second vane of the plurality of vanes and the second connection of the third vane of the plurality of vanes;
wherein rotational force from the second vane of the plurality of vanes is transmitted across the second vane of the plurality of vanes to the link between the second vane of the plurality of vanes and the third vane of the plurality of vanes, thereby causing the third vane of the plurality of vanes to rotate between the open position, and the closed position.

10. The kinematic linkage assembly of claim 7 wherein the pivot is a vane post extending from the second piece through the first piece.

11. The kinematic linkage assembly of claim 7 wherein the pivot includes an offset aperture formed on the first piece that receives an offset post formed on the second piece.

12. A kinematic linkage assembly for an active grille shutter system comprising:
an active grille shutter system having a frame forming an aperture, wherein the frame has two frame end caps on two parallel sides of the aperture, the frame is connectable to a vehicle engine compartment at an air intake region;
a kinematic linkage assembly with a plurality of vanes extending between the two frame end caps and are each moveable between an open position and a closed position such that when in the closed position, air is prevented from moving through the aperture of the frame and when in the open position, air is able to move past the plurality of vanes through the aperture of the frame;

wherein the plurality of vanes each have a first end rotatably connected to a first vane end cap that is rotatably connected to a first one of the two frame end caps and a second end of each of the plurality of vanes has a second end rotatably connected to a second vane end cap that is rotatably connected to a second one of the two frame end caps, wherein the first vane end cap and second vane end cap of the plurality of vanes includes a two piece end cap each having a first piece having at least one vane retainer, and a second piece having at least one vane retainer, wherein the first piece and the second piece are connected together at a pivot and when one of the plurality of vanes is placed in contact with the at least one vane retainer of the first piece and the at least one vane retainer of the second piece the first piece and the second piece rotate about the pivot;

a first link rotatably connected to the first vane end cap of a first vane of the plurality of vanes and the first vane end cap of a second vane of the plurality of vanes; and an actuator operably connected to the second vane end cap of the first vane of the plurality of vanes for providing force that rotates the plurality of vanes between the open position and the closed position wherein rotational force from the actuator is transmitted across the first vane of the plurality of vanes, rotates the first vane end cap connected to the first vane of the plurality of vanes, which transfers force through the first link to the first vane end cap of the second vane of the plurality of vanes, which transfers force across the second vane of the plurality of vanes to the second vane end cap connected to the second end of the second vane of the plurality of vanes; and an end stop forming part of the kinematic linkage assembly, for contacting one of the first vane end cap or the second vane end cap connected to one of the plurality of vanes, when one of the plurality of vanes is overdriven.

13. The kinematic linkage assembly of claim 12 further comprising:
a third vane of the plurality of vanes;
a link bar connected between the second vane end cap of the second vane of the plurality of vanes and the second vane end cap of the third vane of the plurality of vanes;
wherein rotational force from the second vane end cap of the second vane of the plurality of vanes is transmitted through the link bar between the second vane end cap of the second vane of the plurality of vanes and the second vane end cap of the third vane of the plurality of vanes, thereby causing the third vane of the plurality of vanes to rotate between the open position, and the closed position.

14. The kinematic linkage assembly of claim 12 wherein the pivot is a vane post extending from the second piece through the first piece.

15. The kinematic linkage assembly of claim 12 wherein the pivot includes an offset aperture formed on the first piece that receives an offset post formed on the second piece.

* * * * *